(12) United States Patent
Keretli et al.

(10) Patent No.: US 7,563,523 B2
(45) Date of Patent: Jul. 21, 2009

(54) FUEL CELL START-UP METHOD, FUEL CELL SYSTEM AND VEHICLE EQUIPPED WITH SAME

(75) Inventors: Fahri Keretli, Le Mesnil St-Denis (FR); Marielle Marchand, Saclay (FR)

(73) Assignee: Renault s.a.s., Boulogne, Billancourt (FR)

( * ) Notice: Subject to any disclaimer, the term of this patent is extended or adjusted under 35 U.S.C. 154(b) by 762 days.

(21) Appl. No.: 10/517,610

(22) PCT Filed: Jun. 24, 2003

(86) PCT No.: PCT/FR03/01935

§ 371 (c)(1),
(2), (4) Date: Sep. 9, 2005

(87) PCT Pub. No.: WO04/001887

PCT Pub. Date: Dec. 31, 2003

(65) Prior Publication Data

US 2006/0127712 A1    Jun. 15, 2006

(30) Foreign Application Priority Data

Jun. 24, 2002   (FR) .................................. 02 07800

(51) Int. Cl.
*H01M 8/04* (2006.01)
*H01M 8/06* (2006.01)

(52) U.S. Cl. .............................. 429/12; 429/17; 429/19; 429/20; 429/24; 429/26

(58) Field of Classification Search .................... 429/12, 429/13, 17, 19, 20, 24
See application file for complete search history.

(56) References Cited

U.S. PATENT DOCUMENTS

| 6,410,175 B1 * | 6/2002 | Tillmetz et al. ............... 429/13 |
| 2004/0253491 A1 * | 12/2004 | Boudjemaa et al. ........... 429/17 |

FOREIGN PATENT DOCUMENTS

| DE | 100 10 068 | 9/2001 |
| FR | 2 829 296 | 3/2003 |
| JP | 07-169490 | 7/1995 |
| WO | 00/30200 | 5/2000 |
| WO | 02/055433 | 7/2002 |

* cited by examiner

*Primary Examiner*—Patrick Ryan
*Assistant Examiner*—Amanada Barrow
(74) *Attorney, Agent, or Firm*—Oblon, Spivak, McClelland, Maier & Neustadt, P.C.

(57) ABSTRACT

The invention relates to a fuel cell start-up method, said fuel cell comprising numerous cells which are supplied by a reformer (10). According to the invention, when the reformer is cold, reformates are supplied to a first sub-assembly (12) of cells of the fuel cell and, when the reformer is hot, reformates are supplied to the first and second sub-assemblies of cells of the fuel cell. The cells belonging to the first sub-assembly are optimized in order to operate with a cold reformer and the cells belonging to the second sub-assembly (13) are optimized to operate with a hot reformer.

13 Claims, 2 Drawing Sheets

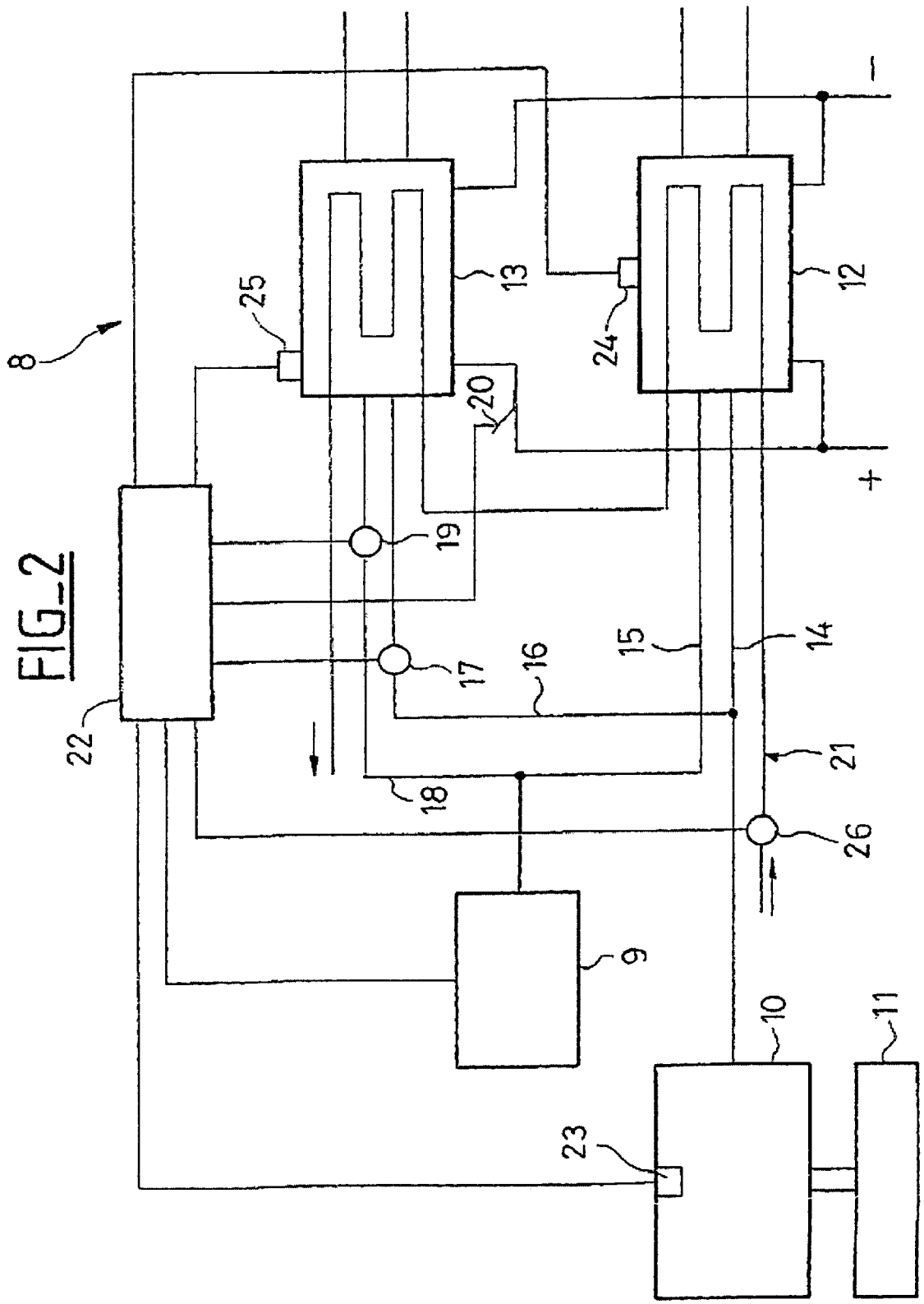
FIG_2

FUEL CELL START-UP METHOD, FUEL CELL SYSTEM AND VEHICLE EQUIPPED WITH SAME

The present invention relates to the area of fuel-cell stacks and to propulsion systems comprising a fuel-cell stack.

Traditionally, a fuel-cell stack system with gas reforming is capable of generating electric power for supplying an electric motor, for example for propelling a vehicle.

The system comprises a reformer with which hydrogen can be generated from a fuel, such as gasoline or methanol carried on board the vehicle, a stack permitting the generation of electric power from the hydrogen supplied by the reformer and from the oxygen of the air, and auxiliary equipment, especially an air compressor and a cooling circuit.

The fuel-cell stack can be composed of a plurality of cells connected in series to reach the operating voltage of the power train of the vehicle. These cells are dimensioned as a function of the nominal power that must be achieved in the power train.

A cell of a fuel-cell stack comprises a bipolar plate and an electrode/membrane assembly. The cell consumes hydrogen to form protons and electrons at the anode. The protons are transferred to an electrolyte through the membrane, and the electrons are transferred by the bipolar plates to the electric circuit of the stack output. At the cathode, oxygen of the air combines with the protons and the electrons to form water.

The bipolar plate must ensure uniform distribution of the reagents over the electrodes, conduct the electrons, evacuate the water produced during the electrochemical reaction to the outside, evacuate the heat produced during exothermic reactions and assure gastightness. It can be made of graphite, conductive polymer, metal, etc. The bipolar plate may be of the "channel" type or of the "porous" type. The cathode and anode can be fixed on opposite sides of the membrane constituting electrolyte. The proton exchange membrane ensures flow of protons from the anode to the cathode and ensures gastightness. It can be made of sulfonated perfluorinated material such as NAFION, ACIPLEX, etc.

The electrodes, the anode and cathode, ensure supply of the reagents to the reaction sites, perform the electrochemical reactions and evacuate the reaction products to the bipolar plates. The electrodes can be made of a carbon fabric that additionally contains a catalyst such as platinum for the reactions, as well as hydrophobic agents such as PTFE to evacuate the water. The electrodes and the membrane are intimately connected to ensure transfer of a reagent from one medium to the other, for example by hot pressing of the electrodes onto the membrane, or else by direct deposition of the electrodes on the membrane.

The chemical energy contained in the gases and not transformed to electricity reappears in the form of heat. At present, the known materials for the membrane must be maintained at a temperature below 80° C. It is therefore necessary to provide a cooling circuit. A cooling cell can be interposed every one to three cells. The cooling cell has a shape similar to that of a bipolar plate but is used for circulation of a cooling fluid such as water or water containing an antifreeze product.

The most severe operating conditions for a stack in an automobile application occur during the starting phase, where the stack must produce electricity as rapidly as possible. Consequently the materials are subjected to severe thermal stresses, since the temperature rises from ambient to operating temperature in a few minutes.

In addition, in order to raise the temperature of the fuel-cell stack rapidly, the cells must operate at low voltages to generate a large quantity of heat required for their temperature rise, and this necessitates the use of robust materials.

Furthermore, in the case of hydrogen supply by a reformer, the anodic catalysts based on platinum alloy used in the stack are very sensitive to carbon monoxide, which is a byproduct of the reforming reactions.

During starting phases, the reformer must be brought up to temperature and, during this phase, it produces a greater quantity of carbon monoxide than during the subsequent operating phases.

For these reasons, the fuel-cell stacks are generally overdimensioned, for example with an extra quantity of catalysts in the electrodes, thus substantially increasing the cost thereof.

Moreover, in order to improve the cooling of the fuel-cell stack, it is desired to raise the operating temperature. The materials envisioned for a high-temperature fuel-cell stack have a limited operating range. For example, polybenzimadazole (PBI) has good ionic conductivity only at temperatures of 120° C. and above, thus leading to prolongation of the starting duration of the stack. In fact, it is necessary to raise the entire fuel-cell stack to this temperature before it can begin to produce electricity.

The very rapid dynamics imposed in an automobile application also require that the fuel-cell stacks be overdimensioned, so that they can respond rapidly to abrupt power variations.

International Patent WO 00/30200 (Ballard Power Systems) describes a fuel-cell stack system provided with a reformer. During a starting phase, the fuel being used to supply the reformer is directed toward at least one portion of the cells of the fuel-cell stack. By direct oxidation of the fuel, the cells of this portion deliver an output power at least until the reformer is operational. Thus the risk exists that the cells supplied directly with reformer fuel will be rapidly degraded even if great expense is incurred for construction thereof.

The invention proposes to solve this problem.

The invention proposes, for starting the fuel-cell stack, a method that is fast, economical, and does little harm to the fuel-cell stack.

According to one aspect of the invention, the starting method is intended for a fuel-cell stack comprising a plurality of cells supplied by a reformer. When the reformer is cold, a first subassembly of cells of the fuel-cell stack is supplied with reformate. Thereafter, when the reformer is hot, the first and second subassemblies of cells of the fuel-cell stack are supplied, the cells of the first subassembly being optimized for operation with a cold reformer and the cells of the second subassembly being optimized for operation with a hot reformer.

There is understood by cold reformer, a reformer that has not reached its optimal operating condition, and by hot reformer, a reformer that has reached its optimal operating condition.

In this way it is possible to construct the cells of the second subassembly in a manner optimized for high efficiency and low cost, these cells being able to demand hydrogen-rich reformates. Furthermore, the ability of the cells of the first subassembly to operate with hydrogen-lean reformates that may contain a notable proportion of carbon monoxide or other compounds containing oxygen and/or carbon in addition to hydrogen is optimized.

Such a method makes it possible to render a fuel-cell stack operational very quickly, thus removing a very important obstacle to the commercialization of vehicles equipped with fuel-cell stacks—an obstacle represented by the duration that the driver must wait after pressing a starting button until the moment when the vehicle is truly operational, or in other words has sufficient electric power that it can run under appropriate conditions.

In one embodiment of the invention, the cells of the second subassembly are supplied when the said cells are at an appropriate operating temperature. If the operating temperature has not been reached, the cells of the second subassembly are not supplied. The cells of the second subassembly can therefore be made with materials having high performance, especially as regards efficiency, but also meeting high requirements in the matter of operating-temperature range.

Advantageously, a cooling circuit common to the first and second subassemblies of cells of the fuel-cell stack is activated when the temperature of the first subassembly of cells reaches a temperature threshold.

In a first phase, during a cold start, the cooling circuit is deactivated to ensure that the cells of the first subassembly rapidly rise in temperature.

Then, in a second phase, the cooling circuit is activated to ensure that the cooling fluid circulates between the first and second subassemblies of cells, in such a way that the heat released by the cells of the first subassembly is used to bring the cells of the second subassembly up to temperature.

Finally, in a third phase, when the temperature of the cells of the second subassembly has reached a temperature threshold, the cooling fluid of the cooling circuit circulates in the cells of the first and second subassemblies as well as in a radiator, thus permitting the heat produced to be evacuated to the outside.

The present invention also proposes a fuel-cell stack system comprising a fuel-cell stack provided with a plurality of cells and a reformer capable of supplying hydrogen from a hydrocarbon fuel.

The system comprises a first subassembly of cells optimized to operate with a cold reformer and a second subassembly of cells optimized to operate with a hot reformer, and means for supplying the second subassembly of cells as a function of the reformer temperature.

The invention likewise proposes a fuel-cell stack system comprising a fuel-cell stack provided with a plurality of cells and a reformer capable of supplying hydrogen from a hydrocarbon fuel.

The system comprises a first subassembly of cells optimized to operate when cold and a second subassembly of cells optimized to operate when hot, and means for supplying the second subassembly of cells as a function of their temperature. Thus materials with high operating temperature can be used for the second subassembly of cells, which permits effective cooling.

There is understood by
  operating when cold, operation of the stack from ambient temperature up to the minimum temperature of the second subassembly and with an anodic gas than can be discharged from a cold reformer, and by
  operating when hot, operation of the stack in its ideal temperature range with an anodic gas discharged from a hot reformer.

Advantageously, the system comprises a cooling circuit common to the first and second subassemblies of cells, in such a way that the heat released by the first subassembly of cells heats the second subassembly of cells when the latter is shut down.

In one embodiment of the invention, the system comprises a pilot-controlled valve mounted on a reformate-supply conduit of the second subassembly of cells, a pilot-controlled valve mounted on an air-supply conduit of the second subassembly of cells, and an electronic switch mounted on an output conductor of the second subassembly of cells.

In this way it is possible to interrupt the supply of reformate and of air to the second subassembly of cells when these operating conditions are not present in combination. It is also possible to isolate the second subassembly of cells electrically.

In one embodiment of the invention, the system comprises a central unit provided with means to run a software routine, with a memory and with at least one software routine stored in the memory. The software routine comprises a module to activate a cooling circuit when the temperature of the first subassembly of cells reaches a temperature threshold.

It is understood that the subdivision of the fuel-cell stack into two subassemblies comprising different materials makes it possible to lower the cost of the stack, because the starting stresses are applied to only one of the subassemblies. Only that subassembly must contain the materials that are most resistant to cold operation of the said subassembly and of the reformer.

Another advantage of the invention lies in improving the energy efficiency of the fuel-cell stack, because the cells of the second subassembly generate electric power only when they have reached their optimal temperature range and therefore do so with high efficiency.

A vehicle equipped with an electric propulsion motor and a fuel-cell stack capable of supplying the motor has a high degree of autonomy with greatly reduced pollution and fast starting.

The present invention will be better understood by studying the detailed description of several non-limitative practical examples illustrated by the attached drawings, wherein:

FIG. 2 is a schematic view of the system according to one aspect of the invention.

Figure 1:
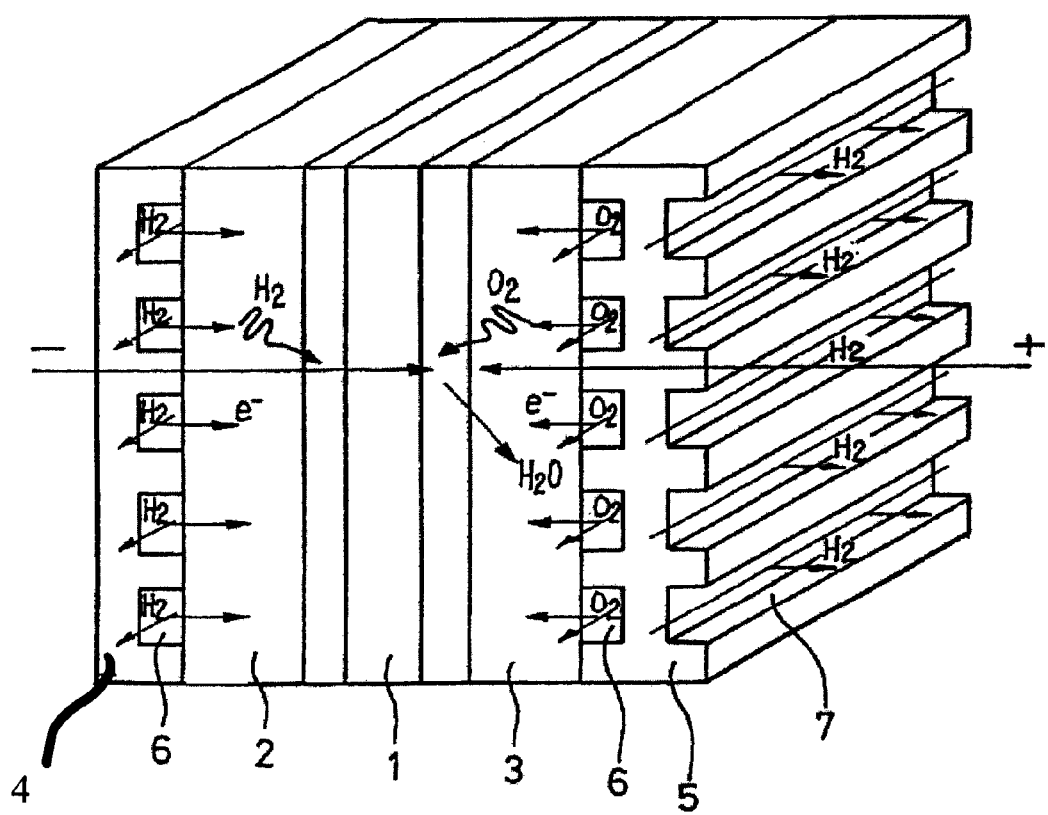
FIG. 1 is a schematic view of one cell of a fuel-cell stack.

As can be seen in FIG. 1, a cell of a fuel-cell stack comprises a membrane 1 performing the function of electrolyte, an anode 2 disposed on one side of membrane 1 and a cathode 3 disposed on the opposite side, a plate 4 on the side of anode 2 opposite membrane 1 and a plate 5 disposed on the side of cathode 3 opposite plate 1. Plate 4 is provided with channels 6 forming open grooves on the side of anode 2. The same is true for plate 5, which is provided with open channels 6 on the side of cathode 3 and with open channels 7 on the opposite side, which can be brought into contact with the anode of another cell.

In FIG. 2 there is illustrated a system according to one aspect of the invention. The system comprises a fuel-cell stack 8, an air compressor 9 and a reformer 10 supplied with fuel by a reservoir 11. Fuel-cell stack 8 comprises two subassemblies 12 and 13. Each subassembly 12, 13 comprises one or more cells such as described hereinabove. A conduit 14 is mounted between the outlet of reformer 10 and the inlet of subassembly 12 in order to supply the said subassembly 12 with reformate. By "reformate" there is understood here the chemical compounds produced by the reformer, including hydrogen, the proportion of which is desired to be as high as possible, carbon monoxide, the proportion of which is desired to be as low as possible but which generally increases when the reformer has not reached its ideal operating temperature or else during transient phases, and possibly other compounds containing hydrogen, oxygen and/or carbon.

A conduit 15 is mounted between the outlet of air compressor 9 and subassembly 12. A conduit 16 is branched off from conduit 14 to open into subassembly 13. A pilot-controlled valve 17 is mounted on conduit 16. Similarly, a conduit 18 equipped with a pilot-controlled valve 19 is branched off from air conduit 15 to open into subassembly 13. The electrical outputs of subassemblies 12 and 13 are connected in parallel, but nevertheless an electronic switch 20 is mounted on one of the electrical outputs of subassembly 13 to ensure that it can be isolated electrically.

There is provided a cooling circuit 21, which comprises a conduit that passes through subassemblies 12 and 13 to ensure cooling thereof and a pilot-controlled valve 26, the cooling fluid passing first through subassembly 12 and then through subassembly 13. The system also comprises a central unit 22 capable of actuating the other elements, in particular compressor 9, and pilot-controlled valves 17, 19 and 26. Switch 20 is connected to a temperature sensor 23 of reformer 10, a temperature sensor 24 of subassembly 12 and a temperature sensor 25 of subassembly 13.

Subassembly 12 is optimized to support, on the one hand, operation at low temperature and, on the other hand, a hydrogen-lean supply, or in other words a supply containing reformates rich in carbon monoxide from reformer 10, itself at low temperature.

The cells of subassembly 12 are therefore provided with a quantity of catalysts, such as platinum or platinum alloy, that is higher than that of the cells of subassembly 13, with catalysts adapted to carbon monoxide poisoning, with a membrane whose low-temperature conductivity is sufficient to deliver adequate electric power immediately upon starting, and finally with a sufficiently thick membrane.

Subassembly 13 will operate once it has reached its operating temperature and once the reformer is delivering reformate with a sufficiently low carbon monoxide ratio.

The cells of subassembly 13 can therefore be provided with a smaller quantity of catalysts, with catalysts adapted to the carbon monoxide ratio of reformates delivered by the reformer during continuous operation, with a membrane having excellent ionic conductivity at its continuous operating temperature and finally with a membrane of small thickness.

Upon startup of a vehicle equipped with such a system, a procedure for bringing the reformer up to temperature is activated, for example by means of a fuel burner integrated into the reformer. Normally, the reformer begins to produce hydrogen only once it has reached its operating temperature, which typically is 800° C.

Nevertheless, the production of hydrogen may begin at much lower temperature, on the order of 600 to 700° C., albeit with reformates containing a high carbon monoxide ratio that is incompatible with the cells of subassembly 13 but compatible with the cells of subassembly 12. The reformate produced in this way, rich in carbon monoxide, is sent to the cells of subassembly 12, valve 17 being closed. It will also be noted that valve 19 is closed and that switch 20 is open. Thus only subassembly 12 is supplied with hydrogen and with air, and it generates electric energy. The thermal losses due to electricity generation bring subassembly 12 from ambient temperature to its optimal operating-temperature range.

Cooling circuit 21 is inactive and pump 26 is stopped as long as a temperature below a first threshold, such as 80° C., has not been reached by subassembly 12, the temperature of which is measured by sensor 24. As soon as temperature sensor 24 measures a temperature above the first threshold, central unit 22 commands pump 26 to begin operating, thus circulating a cooling fluid in subassemblies 12 and 13. Heat transfer takes place from subassembly 12 to subassembly 13, which progressively heats up.

When temperature sensor 25 of subassembly 13 detects a temperature above a second threshold, which may be a threshold higher than the first threshold used for subassembly 12, such as 120° C., and when temperature sensor 23 of reformer 10 detects a temperature above a third threshold, such as 800° C., central unit 22 commands pilot-controlled valves 17 and 19 to open. The temperature condition on reformer 10 guarantees a reformate in which the carbon monoxide concentration is compatible with subassembly 13 and the temperature condition on subassembly 13 guarantees good energy efficiency thereof. Switch 20 is closed. Subassembly 13 is supplied with fuel and oxygen carrier and is connected to the electric power system.

If the energy consumption of the power train (not illustrated) is greater than the electric power generated by subassembly 13 during the temperature-rise phase, supplementary power can be supplied by a battery (not illustrated).

The fact that the fuel-cell stack is composed of two subassemblies having different characteristics and made of different materials makes it possible to lower the overall cost of the stack, because the requirements due to starting are applied to only one of the subassemblies, while the other subassembly can be of less robust construction and be provided with a smaller quantity of catalysts.

Of course, the pile can also be subdivided into a larger number of subassemblies, such as three or four, which could be brought into operation successively as a function of the composition of the reformate delivered by the reformer.

The invention also permits great modularity in the arrangement of the cells of the fuel-cell stack, and above all it permits fast starting of the vehicle equipped with such a fuel-cell stack, thus greatly increasing the pleasure of using of such a vehicle and potentially facilitating the marketing thereof.

Finally, the invention permits an improvement of the energy efficiency of the stack, because the second subassembly generates electric energy only when it has reached its optimal temperature range, in which it exhibits high efficiency.

The invention claimed is:

1. A method for starting a fuel-cell stack, comprising a plurality of cells supplied by a reformer, said method comprising the following steps;
   supplying, when the reformer is cold, a first subassembly of cells of the fuel-cell stack with reformates from said reformer while a second subassembly of cells of the fuel-cell stack is not supplied with reformates, and then
   supplying, when the reformer is hot, the first and second subassemblies of cells of the fuel-cell stack with reformates from said reformer,
   wherein the cells of the first subassembly are optimized for operation with a cold reformer and the cells of the second subassembly are optimized for operation with a hot reformer.

2. A method according to claim 1, wherein the cells of the second subassembly are only supplied when the said cells are at an appropriate operating temperature.

3. A method according to claim 1, wherein a cooling circuit common to the first and second subassemblies of cells of the fuel-cell stack is activated when the temperature of the first subassembly of cells reaches a temperature threshold.

4. A fuel-cell stack system, comprising:
   a fuel-cell stack provided with a plurality of cells;
   a reformer capable of supplying hydrogen from a hydrocarbon fuel, wherein a first subassembly of cells is optimized to operate with a cold reformer and a second subassembly of cells is optimized to operate with a hot reformer, and
   means for supplying reformates from said reformer to said first subassembly of cells while not supplying said second subassembly of cells and for supplying the second subassembly of cells as a function of the reformer temperature.

5. A system according to claim 4, further comprising means for supplying the second subassembly of cells as a function of the temperature of the said second subassembly.

6. A system according to claim 4 or 5, further comprising a cooling circuit common to the first and second subassemblies of cells, in such a way that the heat released by the first subassembly of cells heats the second subassembly of cells when the second subassembly is shut down.

7. A system according to claim 4, further comprising a pilot-controlled valve mounted on a reformate-supply conduit of the second subassembly of cells, a pilot-controlled valve mounted on an air-supply conduit of the second subassembly of cells, and an electronic switch mounted on an output conductor of the second subassembly of cells.

8. A system according to claim 4, further comprising a central unit provided with means to run a software routine, with a memory and with at least one software routine stored in the memory, the software routine comprising a module to activate a cooling circuit when the temperature of the first subassembly of cells reaches a temperature threshold.

9. A vehicle comprising a power train with electric motor and a fuel-cell stack system according to claim 4.

10. A system according to claim 4, wherein said means for supplying comprise a pilot-controlled valve that controls a flow of reformate between said reformer and said second subassembly of cells.

11. A system according to claim 10, wherein said means for supplying further comprise a fuel reservoir connected to said reformer so as to feed fuel directly to said reformer, wherein said fuel reservoir is not directly connected to said first second subassembly of cells nor to said first second subassembly of cells such that said fuel reservoir does not feed fuel directly to said first second subassembly of cells nor to said first second subassembly of cells.

12. A system according to claim 4, wherein said means for supplying further comprise means for supplying reformates to the cells of the second subassembly only when the said cells of the second subassembly are at an appropriate operating temperature.

13. A method according to claim 1, further comprising branching off reformate from a conduit connecting said reformer to said first subassembly so as to supply said reformate from said conduit into said second subassembly.

* * * * *